United States Patent [19]

Hareyama

[11] 3,943,431

[45] Mar. 9, 1976

[54] CURRENT-SPLITTING NETWORK

[75] Inventor: Kyuichi Hareyama, Tokyo, Japan

[73] Assignee: Nippon Electric Company, Limited, Tokyo, Japan

[22] Filed: Dec. 20, 1974

[21] Appl. No.: 534,797

[30] Foreign Application Priority Data

Dec. 28, 1973 Japan .................................. 49-2497

[52] U.S. Cl. ......................... 323/1; 307/12; 307/32; 323/4; 323/9; 323/80; 340/347 DA

[51] Int. Cl.² ........................ H02P 13/16; H02J 1/00

[58] Field of Search ............... 323/1, 2, 4, 9, 79, 80, 323/81; 340/347 DA; 307/12, 15, 31, 22, 35, 52, 53

[56] References Cited

UNITED STATES PATENTS

| | | | |
|---|---|---|---|
| 3,259,835 | 7/1966 | McPherson | 323/79 X |
| 3,474,440 | 10/1969 | Schmid | 340/347 DA |
| 3,731,181 | 5/1973 | Cecil et al. | 323/80 X |
| 3,815,123 | 6/1974 | Howard, Jr. et al. | 340/347 DA |

*Primary Examiner*—Gerald Goldberg
*Attorney, Agent, or Firm*—Hopgood, Calimafde, Kalil, Blaustein & Lieberman

[57] ABSTRACT

A current-splitting network comprises a voltage divider having first and second output terminals, the potentials at the first and second output terminals having a predetermined ratio. A first amplifier is coupled between one end of a first resistor and the first output terminal for holding the potential of the one end of the first resistor substantially at the potential of the first output terminal. A second resistor has a resistance value which has a predetermined ratio to the resistance value of the first resistor, and a second amplifier is coupled between one end of the second resistor and the second output terminal to hold the potential of the one end of the second resistor substantially at the potential of the second output terminal. A constant-current source is connected in common to the other end of the first and second resistors such that a constant current fed from the constant-current source is split to flow through the first and second resistors. This current-splitting ratio is determined by the ratio between the resistance values of the first and second resistors and the ratio between the potentials at the first and second output terminals.

3 Claims, 2 Drawing Figures

CURRENT-SPLITTING NETWORK

Figure 2:
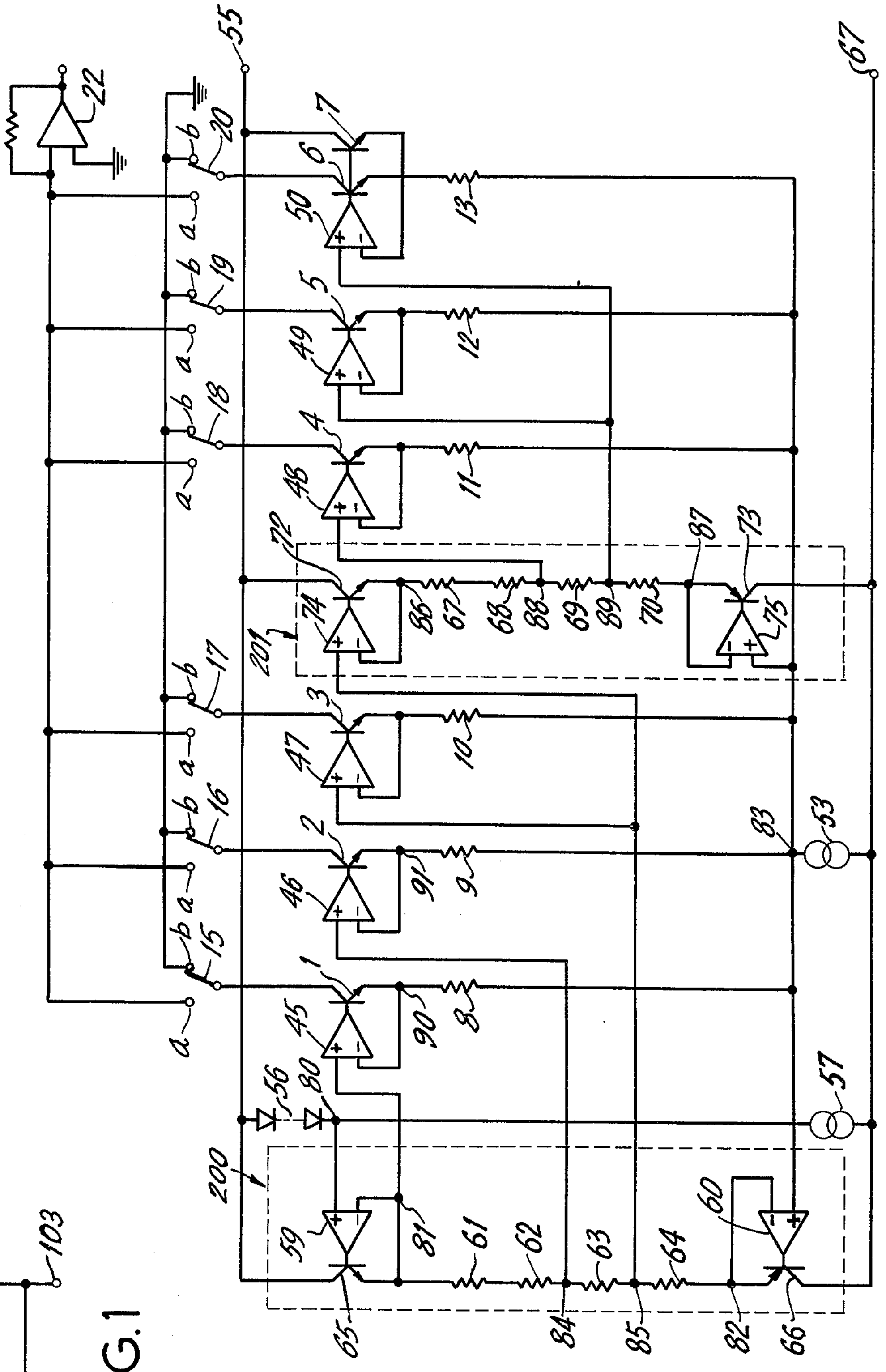

The present invention relates generally to a current-splitting network, and more particularly to a current-splitting network suitable for application to a digital-to-analog converter for converting a digital value to an analog value (hereinafter referred to as a D-A converter).

A D-A converter generates a particular magnitude of an electric component in response to the existence of a particular bit signal applied to its digital input. The sum of the respective current components which have been generated in this manner in response to the existence of the respective bit signals in the digital input signal thus constitutes an output electric current having an analog value corresponding to the digital value represented by the input digital signal. By way of example, in the case of a 6-bit D-A converter, as a means for responding to the existence of the respective weighted bit signals, six current switching circuits are provided. An electric current must be split in a correct proportion and then fed to the respective ones of the six current switching circuits which are responsive to the respective six weighted bit signals. Heretofore, in order to form such means for splitting a current, an R-2R resistor ladder network and six current splitting transistors were required.

The formation of such a D-A converter in a monolithic integrated circuit type is accompanied with difficulties. Despite the requirement that the ratio between the respective resistance values of the resistors forming the R-2R resistor ladder network be maintained at a desired value with high precision it is difficult to do so. Moreover, despite the fact that the ratio between the emitter areas of the current splitting transistors also must be selected at a ratio proportional to the electric currents flowing through the respective transistors, it is difficult to maintain this ratio between the emitter areas at a desired value with high precision. Furthermore, when a large number of bits are involved, the emitter areas of these transistors are necessarily increased.

Generally it is difficult to enhance the precision of the ratio of resistance values between a large number of resistors. Especially, in the case of a resistor ladder network, the number of resistors is large, and further an R-2R resistor ladder network is composed of resistors having resistance values of R and 2R and the resistor having a resistance value of 2R is made of two serially connected resistors each having a resistance value of R, so that the number of the resistors is further increased. It is thus very difficult to obtain a precise resistance ratio.

It is an object of the invention to provide a current-splitting network in which the number of resistors whose resistance values are required to be maintained at a given ratio with high precision is reduced.

It is another object of the present invention to provide a current-splitting network in which there is no need to preselect emitter areas of transistors in proportion to the values of the electric currents flowing therethrough, while still obtaining a highly precise current-splitting ratio.

It is still another object of the present invention to provide a current-splitting network with high precision that is suitable for inclusion in a D-A converter of monolithic IC type.

The current-splitting network according to the present invention comprises a voltage divider having first and second output terminals the, potentials at the first and second output terminals having a predetermined ratio. A first amplifier is coupled between one end of a first resistor and the first output terminal for holding a potential of the one end of the first resistor substantially at the potential of the first output terminal. A second resistor has a resistance value which has a predetermined ratio to the resistance value of the first resistor, and a second amplifier is coupled between one end of the second resistor and the second output terminal for holding the potential of the one end of the second resistor substantially at the potential of the second output terminal. A constant current source is connected in common to the other ends of the first and second resistors, such that a constant current fed from the constant current source is split to flow through the first and second resistors. This current splitting ratio is determined by the ratio between the resistance values of the first and second resistors and the ratio between the potentials at the first and second output terminals. Therefore, if the resistance values of the first and second resistors are selected equal to each other, then the aforementioned constant current is split at the ratio between the potentials of the first and second output terminals of the voltage divider.

As described, according to the present invention, it is only necessary to maintain the potential ratio between the output terminals of the voltage divider at a given value with high precision and to maintain the resistance ratio between the first and second resistors at a given value with high precision. Therefore, when the voltage divider consists of resistors in series connection, it is not necessary at all to take into consideration the precision of the ratio between the voltage dividing resistors and the first and second resistors. It is only necessary to consider the precision of the ratio between resistors among a small number of resistors. As a result, according to the present invention, a current-splitting network having a highly precise current splitting ratio can be obtained.

Figure 1:
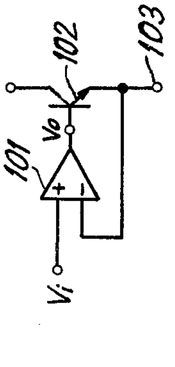

In order to make the present invention more comprehensible, it will be described in more detail hereinunder with reference to the accompanying drawing, in which:

FIG. 1 is a circuit diagram of an amplifier which can be employed to advantage in a current-splitting network according to the present invention, and FIG. 2 is a circuit diagram of a current-splitting network according to one embodiment of the present invention as applied to a 6-bit D-A converter.

Referring now to FIG. 1, a well-known amplifier to be used in the current-splitting network according to an embodiment of the present invention is illustrated, in which a differential amplifier 101 has a voltage gain A. The output of amplifier 101 is connected to a base of the NPN transistor 102, whose emitter is in turn connected to a terminal 103 and to an inverted input of the differential amplifier 101 to apply active feedback thereto. It is assumed that an uninverted input of the differential amplifier 101 is applied with a voltage $V_i$, and that a voltage Vo appears at an output of amplifier 101. Accordingly, the inverted input of the differential amplifier 101 is applied with a voltage $Vo - V_{BE}$, where $V_{BE}$ represents the base-emitter voltage of the transistor 102. Therefore, the following equation is established:

$$Vo = A\left\{V_i - (Vo - V_{BE})\right\}$$

Accordingly, the following equation is derived from the above equation:

$$Vo = \frac{A}{A+1}(V_i + V_{BE})$$

Since the gain A of amplifier 101 is generally large with respect to unity, the above equation can be approximated by $V_o = V_i + V_{BE}$. Accordingly, the emitter potential of the transistor 102 becomes equal to $V_i$, which means that a voltage equal to the input voltage $V_i$ appears at the terminal 103 of the amplifier shown in FIG. 1. In the amplifier of FIG. 1, the transistor 102 may also be a PNP transistor.

FIG. 2 is a circuit diagram of one example of the current-splitting network according to one embodiment of the present invention constructed by making use of the amplifiers shown in FIG. 1, as applied to a 6-bit D-A converter. In this figure, to the respective collectors of NPN transistors 1 to 6, each corresponding to the transistor 102 in the amplifier shown in FIG. 1, are connected the corresponding movable contacts of switches 15 to 20 which are adapted to be switched in response to a 6-bit digital input signal (not shown). Switches 15 to 20 are generally constructed of well-known current switching circuits. The fixed contacts *b* of the switches 15 to 20 are connected in common and grounded, while the fixed contacts *a* of the switches are connected in common to an input of a buffer amplifier 22.

The emitters of the transistors 1 to 6 are respectively connected to one end of the corresponding resistors 8 to 13, and the emitter of an additional transistor 7 is connected to one end of the resistor 13 in common to the emitter of the transistor 6. The other ends of the resistors 8 to 13 are connected in common at a point 83 and to a negative source terminal 67 via a constant-current source 53. Between the respective bases and emitters of the transistors 1 to 6 are connected differential amplifiers 45 to 50, respectively, each corresponding to the differential amplifier 101 in FIG. 1, in the same manner as shown in FIG. 1, so that the emitter potentials of the transistors 1 to 6 are respectively held at the uninverted input potentials of the corresponding differential amplifiers 45 to 50. A collector and a base of the transistor 7 are connected to a positive source terminal 55 and to a base of the transistor 6, respectively, to split the current flowing through the resistor 13 into halves in cooperation with the transistor 6.

A diode 56 serving as a constant voltage element is connected between the positive source terminal 55 and a constant current source 57, and a fixed potential is obtained by this diode 56 at a junction point 80 at which the diode 56 and the current source 57 are commonly connected.

In this embodiment, a voltage divider 200 is connected between the junction points 80 and 83, and comprises voltage dividing resistors 61 to 64 connected in series. Potentials of both ends 81 and 82 of the series connection of resistors 61 to 64 are held at potentials of points 80 and 83 by amplifiers 59 and 60, respectively. More particularly, one end 81 of the series connection of resistors 61, 62, 63 and 64 is connected to an emitter of a transistor 65, whose collector is connected to the positive source terminal 55. The base-emitter path of transistor 65 is connected to the differential amplifier 59 so as to achieve active feedback, and the uninverted input terminal of the amplifier 59 is connected to the junction point 80 which is maintained at a fixed potential. The other end 82 of the series connection of resistors 61–64 is connected to the negative source terminal 67 via an emitter-collector path of a PNP transistor 66. The base-emitter path of transistor 66 is connected to a differential amplifier 60 so as to achieve active feedback, and the uninverted input terminal of the amplifier 60 is connected to a junction point 83 between the resistor 9 and the constant-current source 53.

One ends of the resistors 8, 9 and 10 on the transistor side are respectively held at the potentials of the output terminals 81, 84 and 85 of the voltage divider 200 by means of the differential amplifiers 45, 46 and 47, respectively. For this purpose, the output terminal 81 of the voltage divider 200 is connected to an uninverted input terminal of the amplifier 45, the output terminal 84 between the resistors 62 and 63 is connected to an uninverted input terminal of the amplifier 46, and the output terminal 85 between the resistors 63 and 64 is connected to an uninverted input terminal of the amplifier 47.

In the embodiment of FIG. 2 the uninverted input terminal of the amplifier 45 may be connected to the junction point 80 whose potential is equal to that of the output terminal 81.

In the illustrated embodiment, the voltage at the output terminal 85 is further divided, and one end of the resistors 11, 12 and 13 are held at the divided voltages. A voltage divider 201 consisting of a series connection of resistors 67, 68, 69 and 70 is provided. One end 86 of the series connection of resistors is connected to the positive source terminal 55 via an emitter-collector path of a transistor 72, and the other end 87 of the same series connection is connected to a negative source terminal 67 via an emitter-collector path of a PNP transistor 73. Active feedback to a differential amplifier 74 is applied through the base-emitter path of the transistor 72 and the uninverted input terminal of the differential amplifier 74 is connected to the output terminal 85 between the resistors 63 and 64 in the voltage divider 200. Active feedback is applied to a differential amplifier 75 via the base-emitter path of the transistor 73, and whose uninverted input terminal is connected to the constant-current source 53. Output terminal 88 between the resistors 68 and 69 in the voltage divider 201 is connected to the uninverted input terminal of the differential amplifier 48, and an output terminal 89 between the resistors 69 and 70 is connected to the uninverted input terminals of the differential amplifiers 49 and 50. The resistance values of the resistors 8 to 13 are selected at 2R, the resistance values of the resistors 61 to 64 are selected at R, and the resistance values of the resistors 67 to 70 are selected at R/2.

In the aforementioned circuit, the potentials at one end 90 of the resistor 8 and at one end 81 of the resistor 61 are made equal to the potential at the reference potential point 80 by means of the differential amplifiers 45 and 59, respectively. The potential at one end of the resistor 64 is made equal to the potential at the junction point 83 by means of the differential amplifier 60. Since the resistance values of the resistors 61 to 64 are equal to each other, the voltage between the tap point 84 and the junction point 82 is equal to one-half of the voltage between the opposite ends 81 and 82 of the series connection of the voltage dividing resistors. The potential at one end 91 of the resistor 9 is made equal to the potential at the output terminal 84 by means of the differential amplifier 46. Thus the voltage applied across the resistor 9 is equal to one-half of the voltage applied across the resistor 8. Since the resistance values of the resistors 8 and 9 are both equal to 2R, currents $I_1$ and $I_2$ respectively flowing through the resistors 8 and 9 satisfy the relation of $I_1 = 2I_2$. Similarly, the voltage applied across the resistor 10 is equal to one-fourth of the voltage applied across the resistor 8, so that currents $I_1$ and $I_3$ respectively flowing through the resistors 8 and 10 satisfy the relation of $I_1 = 4I_3$. In a similar manner, a voltage equal to one-fourth of the voltage applied across the resistor 8 is applied across the voltage divider resistor 71, and owing to the voltage dividing effects of the voltage divider resistor 71, voltages equal to one-eighth and one-sixteenth of the voltage applied across the resistor 8 are respectively applied across the resistor 11 and across the resistor 12, so that split electric currents $I_4$ and $I_5$ respectively flowing through the resistors 11 and 12 satisfy the relation of $I_1 = 8I_4 = 16I_5$. In addition, in the same manner ss the resistor 12, a voltage equal to one-sixteenth of the voltage applied across the resistor 8 is applied across the resistor 13, resulting in a current of $I_5 = (1/16)$, $I_1$ flowing through the resistor 13. Current $I_5$ is split into halves by means of the transistors 6 and 7, so that a current of $I_6 = I_1/32$ can be obtained through the transistor 6.

In this way, the current fed from the constant-current source 53 is split into binary-weighted currents $I_1$ through $I_6$. In the above-described construction of the 6-bit D-A converter, the switches 15 to 20 are selectively actuated in accordance with the respective bits in a 6-bit digital signal. If a digital input signal of, for instance, 100100 is applied to the D-A converter, switches 15 and 18 corresponding to bit 1 are switched to the side of the contacts *a*, and the remaining switches 16, 17, 19 and 20 corresponding to bit O are held on the side of the contacts *b*, in response to the digital input signal a current corresponding to the input digital signal of $I_1 + I_4$ is thus applied to the amplifier 22 and the corresponding analog signal voltage is obtained at an output terminal of the amplifier 22.

In the current-splitting network according to the present invention, in order to improve the precision of the ratio between the respective split currents, it is only necessary to independently enhance the precision of the resistance value ratio between the resistors 8 to 13, the precision of the resistance value ratio between the resistors 61 to 64, and the precision of the resistance value ratio between the resistors 67 to 70, respectively. Especially, with regard to the most significant three bits, the precision of the resistance ratio between the resistors 8, 9 and 10 having a resistance value of 2R, and the precision of the resistance ratio between the resistors 61 to 64 having resistance values of R, are principal factors for determining the precision of the current ratios between the fixed electric currents $I_1$ to $I_3$. In this way, a number of resistors whose resistance ratio must be determined with high precision are divided into blocks, each one of the blocks includes a small number of resistors, and the precision of the resistance ratio between a resistor in the block consisting of the resistors 8 to 10 and another resistor in the block consisting of the resistors 61 to 64 can be relatively low. For resistors assembled in a semiconductor integrated circuit, it is relatively easy to obtain high precision of the resistance ratio between a small number of resistor elements having an equal shape. However, if the number of the resistors is increased, the cumulative effect of a temperature gradient on the semiconductor chip, fluctuations and irregularities during the diffusion process, and the like, make it difficult to maintain a high precision of the resistance ratio between the resistors.

In the above-described embodiment of the invention, when attention is paid to the most significant three bits, it is only necessary to enhance the precision of the resistance ratio among at most four resistors. Whereas in the conventional current splitting network including a resistance ladder network, when attention is paid to the most significant three bits, the precision of the resistance ratio among six resistors must be enhanced, and in addition, since the resistor having a resistance of 2R is practically composed of two resistors each having a resistance of R, the number of the resistors whose resistance ratio must be maintained with high precision is further increased to nine.

Still further, in case that all the six bits are taken into consideration, in the network of the present invention, the precision of the resistance ratio among the six resistors 8 to 13, among the four resistors 61 to 64, and among the four resistors 67 to 70, respectively, is significant; in other words, precision of the resistance ratio among at most six resistors is important. On the other hand, in the conventional current-splitting network, the precision of the resistance ratio among 18 resistors each having a resistance value of R is required. In the current-splitting network according to the present invention, a current division of a precisely determined ratio can be realized by merely maintaining high precision of the resistance ratio among a small number of resistors that is one-half the number of resistors for which such precision is required in the conventional current-splitting network.

In addition, as will be apparent from FIG. 2, in the current-splitting network according to the present invention, the emitter areas of the respective transistors 1 to 6 could be made identical, and there is no need to increase the emitter areas of these transistors in proportion to the current to be passed therethrough as is the case with the conventional current-splitting network. As a result, the present invention is extremely effective for forming a current-splitting network in an integrated circuit type.

It will be understood that although the network of the invention has been specifically described hereinabove with respect to a single embodiment, modifications can be made therein without necessarily departing from the spirit and scope of the invention.

What is claimed is:

1. A current splitting network comprising a reference point, a voltage divider having a reference terminal connected to said reference point and first and second output terminals and generating a first voltage at said first output terminal and a second voltage at said second output terminal, said first voltage having a first value with respect to the potential of said reference point and said second voltage having a second value with respect to the potential of said reference point, said first and said second values having a predetermined ratio to one another, a first resistor, a first amplifier coupled between one end of said register and said first output terminal for holding the voltage at said one end of said first resistor substantially at said first voltage, a second resistor of a resistance value having a predetermined ratio to the resistance value of said first resistor, a second amplifier coupled between one end of said second resistor and said second output terminal for holding the voltage at said one end of said second resistor substantially at said second voltage, the other ends of said first and second resistors being connected to said reference point, and a constant current source connected to said reference point, whereby a current fed by said constant-current source is split to flow through said first and second resistors in accordance with the ratio between said first and second voltages and the ratio between the resistance values of said first and second resistors.

2. The current-splitting network according to claim 1, in which said voltage divider comprises a plurality of voltage divider resistors in series connection, a third amplifier for holding the potential of one end of said series connection of said voltage divider resistors at a predetermined potential, and a fourth amplifier for holding the potential of the other end of said series connection of said voltage divider resistors at the potential of said other ends of said first and second resistors.

3. The current-splitting network according to claim 1, further comprising a second voltage divider having a first and a second reference terminal supplied respectively with the potential of said reference point and with said first voltage and third and fourth output terminals and generating a third voltage at said third output terminal and generating a fourth voltage at said fourth output terminal, said third voltage having a third value with respect to the potential of said reference point and said fourth voltage having a fourth value with respect to the potential of said reference point and said third and fourth values having a predetermined ratio to one another, a third resistor, a third amplifier coupled between one end of said second register and said third output terminal for holding the voltage at said one end of said third resistor substantially at said third voltage, a fourth resistor of a resistance value having a predetermined ratio to the resistance value of said third resistor, and a fourth amplifier coupled between one end of said fourth amplifier coupled between one end of said fourth resistor and said fourth output terminal for holding the voltage at said one end of said fourth resistor substantially at said fourth voltage, the other ends of said third and fourth resistors being connected to said reference point, whereby said current fed by said constant-current source is also split to flow through said third and fourth resistors in accordance with the ratio between said third and fourth voltages and the ratio between the resistance values of said third and fourth resistors.

* * * * *

UNITED STATES PATENT OFFICE

CERTIFICATE OF CORRECTION

Patent No. 3,943,431 Dated March 9, 1976

Inventor(s) Kyuichi Hareyama

It is certified that error appears in the above-identified patent and that said Letters Patent are hereby corrected as shown below:

Claim 1, line 68, delete "register" and insert -- first resistor --.

Claim 3, line 12, delete "second register" and insert -- third resistor --.

Signed and Sealed this

*eighteenth* Day of *May 1976*

[SEAL]

*Attest:*

RUTH C. MASON
*Attesting Officer*

C. MARSHALL DANN
*Commissioner of Patents and Trademarks*